Patented Jan. 7, 1947

2,414,028

UNITED STATES PATENT OFFICE 2,414,028

POLYMERIC MATERIALS

Melvin A. Dietrich, Claymont, and James E. Kirby, Wilmington, Del., assignors to E. I. du Pont de Nemours & Company, Wilmington, Del., a corporation of Delaware No Drawing. Application November 3, 1942, Serial No. 464,390

2 Claims. (Cl. 260—2)

This invention relates to polymeric products and more particularly to polymeric aromatic compounds.

Monomeric compounds containing long chain acyl groups on an aromatic nucleous are well known in the art and have been recommended for a number of purposes, notably as additives for lubricating oils to increase the oiliness characteristics of these materials. They are not polymeric in character and generally have a molecular weight below 500. Their effects on properties of lubricants other than oiliness are limited.

This invention has an object a new composition of matter which is highly effective in improving the lubricating properties of oils. A further object is the manufacture of new synthetic waxes valuable for impregnating purposes which have a high solubility, a marked resistance to crystal formation, and a melting point sufficiently low for use under normal operating conditions. Other objects will appear hereinafter.

The new polymeric products described herein are made by acylating in the presence of a Friedel-Crafts catalyst the hydrocarbon polymers obtained by reacting a mono-aromatic methyl halide or alcohol with a polymerization catalyst. These acylated polymeric materials have a molecular weight of at least 2000 and are composed of non-condensed ring aromatic nuclei separated by aliphatic groups containing not more than two carbon atoms with or without an intervening sulfur atom and containing long chain aliphatic acyl groups as substituents on the aromatic nuclei in the proportion of one acyl group to one aromatic nucleus, the aliphatic acyl substituent having a total of at least 12 carbon atoms.

The initial polybenzyl condensation product is obtained by polymerizing the mono-aromatic methyl halide or alcohol with various polymerization catalysts. In the case of the benzyl chloride or alcohol the catalyst can be the Friedel-Crafts catalyst used in the subsequent acylation, namely, aluminum chloride or tin tetrachloride. After acylation the polymer is of the formula

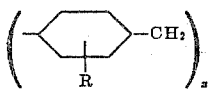

where R is the long chain acyl substituent defined above and $x$ is an integer denoting the number of units in the polymer. When xylylene dihalide or the corresponding alcohol is used in making the initial polymer, suitable polymerization catalysts are alkali metals or sodium sulfide.

The acylated product when the initial polymer is made with alkali metal or catalyst is of the formula

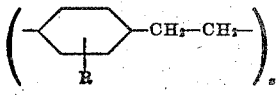

and when made with sodium sulfide is of the formula

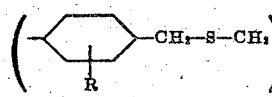

The acylation of the aromatic hydrocarbon polymer is best accomplished by reacting at 20° to 150° C. in the presence of a Friedel-Crafts catalyst with an aliphatic monocarboxylic acid chloride containing at least 12 carbon atoms. Inert solvents have been found to be particularly useful in this Friedel-Crafts reaction. In general, one mol of acyl chloride per aromatic nucleus is employed in this acylation. Although the exact position of the substituents on the aromatic nuclei has not been determined, the ratio of the aliphatic acyl groups to benzenoid groups is approximately unity in the acylated polymer.

The invention is further illustrated by the following examples in which the parts are by weight.

Example I

Thirty parts of benzyl chloride and 0.5 part of tin tetrachloride were mixed and allowed to stand at room temperature, approximately 20° C., for 24 hours. Hydrochloric acid gas was given off and a brittle resin formed which weighed 23 parts. Nine and one-tenth parts of this resin were mixed with 80 parts of cyclohexane as a solvent and 30.2 parts of acylating agent consisting of stearoyl chloride. This mixture was agitated at 80° C. and 5 parts of aluminum chloride added slowly. Vigorous evolution of gas occurred and the resulting mixture was agitated 5 hours. The solution was filtered, dumped into cold water, thoroughly washed, and dried over anhydrous sodium sulfate. The solvent was removed by evaporation and 15 parts of a wax obtained which was liquid at steam bath temperatures (80° C. or above) and readily soluble in various mineral lubricating oils as well as fuel and gas oils. In 0.5% concentration in an SAE 30 paraffin base oil it lowered the pour point from 25° F. to 5° F.

Example II

Nine parts of benzyl chloride polymer obtained as described in Example I, 30 parts of stearoyl chloride, and 10 parts of aluminum chloride were mixed and heated with agitation to 130° C. for 1 hour. Eighty parts of cyclohexane were added, the mixture heated for 15 hours at 40° C., and then poured into 100 parts of 15% hydrochloric acid. After working up in the usual fashion 33 parts of a dark wax-like material was obtained which when used in 0.3% concentration in the paraffin base SAE 30 oil lowered the pour point frrom 25° F. to —15° F.

*Example III*

Thirty-one parts benzyl chloride polymer, 102 parts stearoyl chloride, and 100 parts carbon bisulfide were mixed and 31 parts aluminum chloride added gradually with vigorous agitation. The reaction product was worked up according to well known methods and 92 parts of a soft brown wax obtained, melting below 80° C. When used in 0.1% concentration by weight in the paraffin base SAE 30 oil the pour point was lowered from 25° F. to —5° F.

These polymers obtained by the above examples were very soluble in mineral oils, solutions containing 25% and 30% by weight of polymer being readily prepared. The effectiveness of the polymer as a pour point depressant is further demonstrated by the tests given below on two SAE 30 oils, one of Mid-Continent and one of Pennsylvania stock.

| Per cent of polymer added | Pour point, —° F. | |
|---|---|---|
| | Mid-Continent oil | Pennsylvania oil |
| 0 | +10 | +20 |
| 0.0125 | +5 | +15 |
| 0.025 | 0 | +15 |
| 0.0625 | —10 | —5 |
| 0.125 | —10 | —10 |

The polymers previously mentioned containing a sulfur atom between two methylene groups attached to the aromatic nuclei likewise exert a substantial stabilizing action on mineral oils. These polymers were prepared from xylylene dichloride and sodium sulfide followed by acylation with stearoyl chloride. Thus twenty-five grams of a solvent extracted Mid-Continent SAE 20 oil containing 60 parts per million of dissolved iron (as oleate) were placed in an oxygen absorption apparatus operating at 150° C., using air as the oxygen carrier. This oil, containing 0.5% of the stearoylated xylylene sulfide polymer, absorbed in 690 minutes an amount of oxygen equivalent to 3.4 inches of mercury (as measured on the manometer) compared to an absorption of 4.2 inches for a control sample.

Similar wax-like polymeric products containing no sulfur can be prepared by refluxing xylylene dichloride with sodium in a suitable solvent such as xylene followed by acylation with a long chain acyl chloride such as stearoyl chloride.

A benzyl chloride containing aliphatic substituents in the ortho- and meta-positions may be used in the preparation of a polymer suitable for acylation. Thus, ortho- or meta-methyl, ethyl isopropyl benzyl chlorides are suitable. Similar substituents may be present on a xylylene dichloride used in preparation of the polymer.

For example, ortho-isopropyl-p-xylylene dichloride may be used for polymer preparation prior to acylation.

In place of the benzyl chlorides other halides such as the bromide may be used as well as the alcohol, for example, benzyl alcohol. The initial polymer is best obtained from the chloride since it has been found that the reaction is more readily controlled. Catalysts other than those mentioned in the examples can be used for preparation of the polymers. Thus, aluminum chloride can be used with benzyl chloride instead of tin tetrachloride and potassium or calcium may be used on the xylylene dichloride.

Suitable acid chlorides useful in the acylation of the polymer are lauroyl, myristoyl, palmitolyl, hexadecyleicosanoyl, dodecyloxylacetyl, octadecyloxyacetyl, dodecylthioacetyl, hexadecylthioacetyl, p-(dodecyloxy)benzoyl, p-(pentadecyloxy)benzoyl, 10-phenylstearoyl, 12-ketostearoyl, 4-ketostearoyl, and oleyl. Mixed acid chlorides containing an average of at least 12 carbon atoms may be used such as those derived from saponification of coconut oil, fish oils, castor oil, olive oil, acids derived from oxidation of paraffin wax, and naphthenic acids.

These products are valuable as lubricant and hydrocarbon fuel additives to depress pour point and improve stability, as aids in refining of petroleum products during dewaxing operations, as coatings for protection of metallic surfaces such as steel and iron, as impregnating agents for fabrics and fibers such as cotton, burlap, jute, as ingredients of coating materials such as paints and varnishes, and as a component in furniture polishes. They are also useful as components of varnish removers as well as coatings for paper or other surfaces subject to sticking due to static friction effects. They are suitable for use in greases which are applied to roller bearings, railroad rolling stock, or gears in heavy duty engines.

As many apparently widely different embodiments of this invention may be made without departing from the spirit and scope thereof, it is to be understood that we do not limit ourselves to the specific embodiments thereof except as defined in the appended claims.

We claim:

1. A process for making polymers which comprises heating in the presence of a Friedel-Crafts catalyst a polymer in which the recurring units are

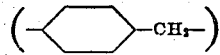

and stearoyl chloride in the ratio of one mol of said chloride to each of said recurring units.

2. A wax-like polymerization product obtained by heating in the presence of a Friedel-Crafts catalyst a polymer in which the recurring units are

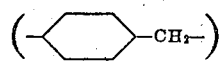

and stearoyl chloride in the ratio of one mol of said chloride to each of said recurring units.

MELVIN A. DIETRICH.
JAMES E. KIRBY.